Figure 5:
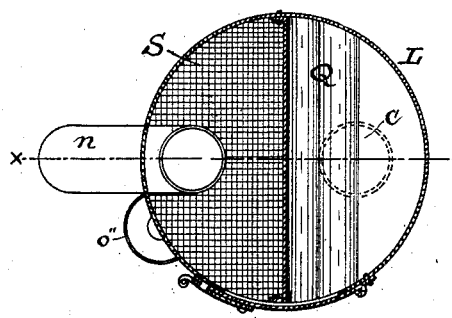

(No Model.) 2 Sheets—Sheet 1.
C. L. HARTSFELD.
FURNACE FOR PRECIOUS METALS.
No. 338,265. Patented Mar. 23, 1886.
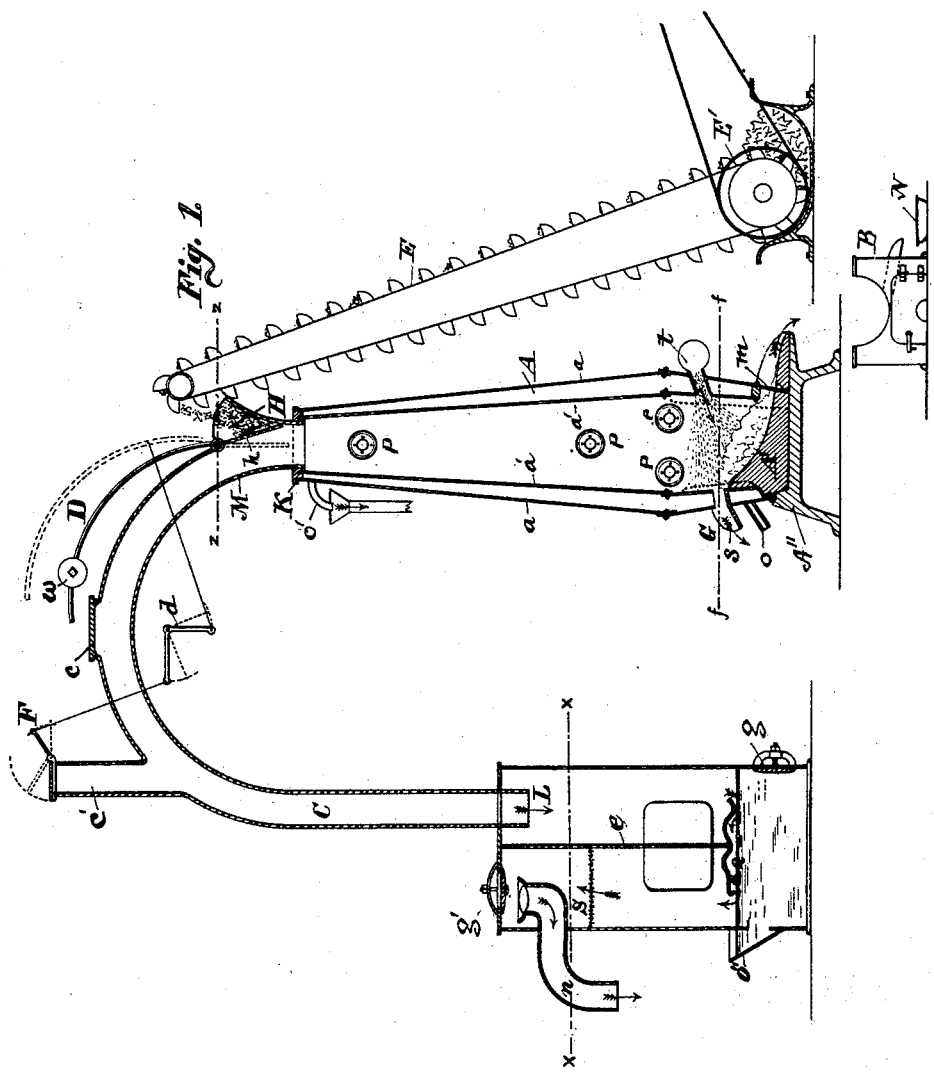
WITNESSES:
INVENTOR
Charles L. Hartsfeld
ATTORNEY (No Model.) 2 Sheets—Sheet 2.

C. L. HARTSFELD.
FURNACE FOR PRECIOUS METALS.

No. 338,265. Patented Mar. 23, 1886.

WITNESSES:

INVENTOR
Charles L. Hartsfeld
ATTORNEY

UNITED STATES PATENT OFFICE.

CHARLES L. HARTSFELD, OF NEWPORT, KENTUCKY.

FURNACE FOR PRECIOUS METALS.

SPECIFICATION forming part of Letters Patent No. 338,265, dated March 23, 1886.

Application filed April 13, 1885. Serial No. 162,020. (No model.)

*To all whom it may concern:*

Be it known that I, CHARLES L. HARTSFELD, a citizen of the United States, residing at Newport, Campbell county, Kentucky, have invented new and useful Improvements in Furnaces for Precious Metals, of which the following is a specification.

My invention relates to apparatus for obtaining precious metals from crude ores, its object being to produce an economical and efficient portable plant for use in remote regions where transportation and repairs are difficult and expensive.

In order to present clearly the nature of my invention, it is necessary to remark that the obtaining of the precious metals—such as gold and silver—is attended with enormous difficulties, owing partly to the usually inaccessible localities where found, and other circumstances. Such ores are commonly found associated with other metals, notably copper and lead, sometimes zinc, and also in various chemical combinations with other substances.

The mode of procedure varies according to the surrounding conditions. Of these, the leaching process—consisting in treating the ore previously crushed with some solution which will dissolve out the desired metals, but not the other constituents of the ore, and then separating the metals from the chemical solution—is usually expensive, and requires certain conditions not often attainable; secondly, the amalgamation or milling process, which consists in treating the crushed ore with quicksilver and water, in which the quicksilver, having a great affinity for gold and silver, takes up and dissolves those metals, thus forming an amalgam, and afterward separating the metal by heat, is also practiced, and likewise requires certain conditions not always attainable.

My invention applies to a third and, on many accounts, more desirable method, which consists in smelting the ore, in connection with suitable fluxes, in a blast-furnace. The construction of a blast-furnace—such as ordinarily used for iron ore—would of course be impracticable in many of the remote localities where precious metals are found, and the object of my invention is the construction and arrangement of a plant, including a portable blast-furnace, which shall be efficient in its operation, at the same time durable in construction, and not liable to become disorganized and require expensive repair.

To this end it consists, primarily, in the construction of a portable blast-furnace for the reduction of such ores by smelting, and in the construction and combination therewith of subsidiary apparatus to be used in connection in the process of smelting the crude ores, and in recovering the metal carried over in the processes of combustion, all as hereinafter more fully set forth.

Figure 2:
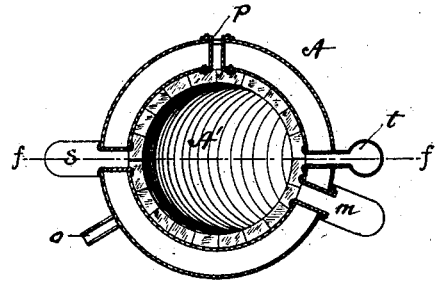
Figure 3:
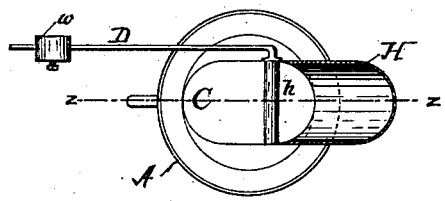
Figure 4:
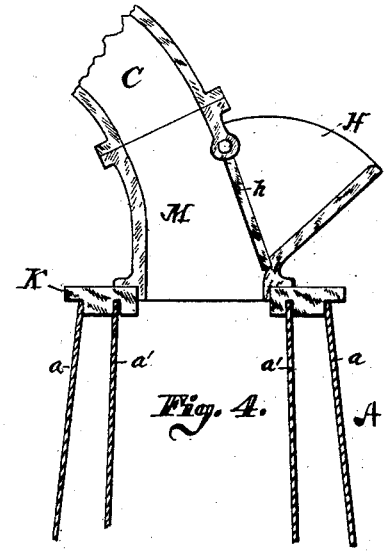

Mechanism embodying my invention is illustrated in the accompanying drawings, in which Figure 1 is a general elevation of the entire plant, the furnace and its immediate connections being sectioned to illustrate the construction. Fig. 2 is a plan section of the furnace, taken horizontally through the boshes on the line $ff$; Fig. 3, a plan section taken through the hopper-casting above the furnace on the line $zz$; Fig. 4, a vertical section taken through the hopper-casting and the upper plate of the furnace; Fig. 5, a horizontal section of the washer on the line $xx$, and Fig. 6 a plan view and vertical cross-section of the "bullion mold."

Referring now to the drawings, in which the parts herein designated are indicated by letters of reference, A designates the furnace proper; H, a filling-hopper provided with an automatic closing-valve, $h$; C, a pipe arranged to convey the gaseous products of combustion from the furnace; L, a washer or scrubber arranged in the path of an exit-pipe for the recovery of the metal carried over in the form of dust or vapors by condensation; E, a feed-belt for lifting the ore, fuel, and fluxes to the feed-hopper H; E', the driving-pulley of the apparatus, and B a pot-furnace for receiving the metal discharged from the furnace A. These constitute the general features of the apparatus, the arrangement of which is substantially as indicated in Fig. 1.

The particular construction of the blast-furnace is as follows: It consists of an outer and inner casing, $a$ and $a'$, respectively, with an annular space between, the general form, as indicated in the drawings, being conical from the boshes upward, narrowing to the main exit-orifice, and slightly conical from thence downward, narrowing toward the bottom. The casings are preferably made in two parts, of ordinary boiler-iron, riveted in corresponding sections at the widest portion, and brought together and riveted at the bottom, where the furnace rests upon a suitable bed-plate, A''. The annular space between the casings is water-tight, excepting at the top, as hereinafter described, and in use is kept full of water, entering at the bottom through pipe o, and discharging at the top by an overflow-pipe, o'. The casing is surmounted at the top by an annular cast-iron top plate, K, suitably grooved at the under side to rest over and upon the casings, and suitably provided for the attachment of a casting, M, including the hopper H, and a section of the uptake C, said casting being provided interiorly with a suitable flange or abutment, against which the hinged valve h of the hopper rests, closing the bottom of the hopper. Within the inner casing at the bottom may be arranged a lining and hearth of fire-brick or fire-clay extending upward to a convenient height, and forming a substitute for the ordinary boshes of iron blast-furnaces. The hearth A', however, is arranged, as indicated in cross-section in Fig. 1, to form a concave inclined plane, highest on the side of the furnace opposite the tuyere t, one or more of which are arranged to pass through the outer and inner casing, so as to direct the blast against the inclined hearth. At the upper extremity of the hearth is arranged a slag-opening, s, which is thus opposite the tuyere-opening, and at the bottom of the hearth is arranged a metal opening, m, which may pass beneath the junction of the casings through a suitably-lined trough in the base-plate. Peep-holes p are arranged in suitable locations by means of pipes passing through the casings and the intervening water-space, and provided with mica partitions in the usual manner. In a suitable portion beneath the metal opening the open-pot furnace B is arranged to receive the molten metal, which, under the circumstances, is of a composite character, and is kept molten for a certain time, to permit the usual separation of metals by gravity. The covering-plate K rests upon and engages the casings by its under grooves without other fastening, as shown in Fig. 4, and to the casting M is joined a curved pipe, C, passing over and down into a scrubber, L, the curved section being provided at its highest elevation with a man-hole, c, with a removable cover normally closed, but by its removal permitting the dislodgment of any accumulations within the curved pipe. There is also provided, in connection with the curved pipe, a short uptake, c', having a closed valve, F, at the top, operating simultaneously, in connection with the closing-valve h of the hopper, the arrangement and operation being as follows: The valve h is provided with an arm, D, furnished with a weight, w, which acts to keep the valve normally closed, and the arm D is attached by a chain and rope to the arm of the valve f, directly or through the medium of a bell-crank, d, in such manner that the opening of the hopper-valve also opens the valve f of the "bleeder" c'. The charge of ore, &c., being thrown into the hopper, its weight opens the hopper-valve and allows the charge to fall into the furnace, at the same time opening the uptake-valve F, to relieve the pressure of the tuyere-blast and prevent the exit of gases through the hopper. I have shown, in connection with this apparatus, an ordinary belt elevator, E, by which the ore and fuel may be elevated and charged to the furnace automatically; but this is not essential, as, where circumstances render it necessary or desirable, the hopper may be charged by hand from a floor at or near the top of the furnace. The particular construction of this elevator need not therefore be more minutely described, as any of the well-known forms of such elevators may be employed, if such use is desirable.

Where any form of blast-furnace has been heretofore employed in connection with the reduction of precious metals, it has been customary to carry the gaseous products of combustion through settling-chambers before reaching the final uptake, in order to collect the metal which passes over in the form of dust. This method, however, is not satisfactory. I therefore use, in connection with the furnace, a scrubber or washer, L, preferably constructed in cylindrical form, which is to be kept filled with water to a given height, and divided by a vertical central partition, e, above that point, the partition terminating close to the surface of the water.

In connection with the vertical partition, I employ a horizontal partition, e, with corrugations extending from side to side, the lower angles of which touch or nearly touch the surface of the water.

The preferred construction will be best understood by a reference to Fig. 1, from which it will be seen that the gaseous products of combustion, including the metallic dust, are passed into a washer, L, at one side of the partition e, and by means of the horizontal corrugated partition e are forced into intimate contact with the water, whence they pass up on the opposite side of the partition through a screen, S, of moistened cloth or similar material, and make their final exit through the pipe n, when they may be again utilized by means of a fan-blower and thrown back into the furnace, if desired.

The washer L is provided with suitable man-holes, g' g, at the top and bottom, for the purpose of cleansing or removing the accumulated solid substance, and with an overflow-spout, o'', for preserving the water at a uniform height. It will also be understood that a suitable force-pump is to be provided, in connection with the apparatus, for maintaining the circulation of water in the blast-furnace, and also in the scrubber.

Figure 6:
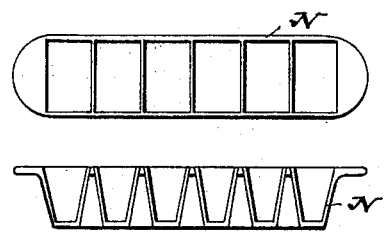

The operation of the device has already been partially indicated, and is as follows: Power being furnished by a driving-engine (not shown in the drawings) for driving the tuyere-blast, circulating the water in the jacket of the furnace, and elevating the fuel by means of an elevator, (where such is used,) the successive charges automatically open the hopper-valve and drop into the furnace. The action of the blast is directed against the hearth at the bottom of the superincumbent mass of ore, slag, and fuel, whence the metal by its gravity passes out below and the slag above in the usual manner through the openings provided for that purpose. The gaseous products of combustion pass over by the pipe C into the washing apparatus, where the metallic dust and vapors are separated out and are subsequently recovered. The air and gases freed from condensable matters pass outward, and may be wholly or partially reutilized, if desired. The molten metal passing from the furnace is received into the pot-furnace B, whence it is run at proper intervals into a mold, N, preferable constructed in several compartments, as shown in Fig. 6, by which the metals are partially separated as the molten liquid fills the successive compartments at successive intervals of time, the heavier metals being discharged from the bottom of the furnace first and the lighter ones in successive order thereafter.

I claim as my invention, and desire to secure by Letters Patent of the United States—

1. The portable water-jacketed blast-furnace A, constructed, as shown and described, of two sheet-iron casings, $a\ a'$, each in two parts in double conical form, separable horizontally at the widest portion, unconnected at the top, provided with a removable annular grooved cap-plate, K, and a bottom plate, A'', an inclined hearth, A, and tuyere-opening $t$, arranged as shown, and metal and slag openings, substantially as set forth.

2. In a portable blast-furnace, in combination with the body of the furnace A and the grooved annular cap-plate K, the removable hopper-casting M, (embracing the hopper H and part of the uptake,) adapted to rest upon and engage within the cap-plate, substantially as set forth.

3. The portable water-jacketed blast-furnace embodying, in combination, the two horizontally-separable casings $a\ a$, bottom plate, A, grooved annular cap-plate K, hopper-casting M, and curved pipe C, constructed and arranged as set forth.

4. In combination with the furnace A, the hopper H, delivery-pipe or uptake C, the bleeder-pipe $c'$, and valve F, the latter provided with actuating connecting mechanism for its automatic operation simultaneously with and by means of the hopper-valve, substantially as set forth.

5. In combination with the blast-furnace A and its uptake, the hopper H, provided with a closing-valve, $h$, and connections, weighted arm D, and the supplemental uptake $c'$ and closing-valve F, substantially as set forth.

6. The combination of the automatic fuel-elevator E, the hopper H, provided with the counterbalanced weighted valve $h$, the bleeder-valve F, and connecting mechanism for the simultaneous operation of the valves, substantially as set forth.

7. In combination with a blast-furnace of the character described and its annular cap-ring K, the hopper-casting M, provided with flanges, as shown, to rest upon and be retained within the cap-ring of the furnace, and with a suitable inner ledge or shoulder for the seating of the horizontal hopper-valve, substantially as set forth.

In testimony whereof I have hereunto set my hand in the presence of two subscribing witnesses.

CHARLES L. HARTSFELD.

Witnesses:
GEO. H. AHLERING,
EDWARD P. SIMMONS.